US010610934B2

(12) United States Patent
Niedermeyer

(10) Patent No.: US 10,610,934 B2
(45) Date of Patent: Apr. 7, 2020

(54) METHOD AND APPARATUS FOR PRODUCTION OF UNIFORMLY SIZED NANOPARTICLES

(71) Applicant: ATTOSTAT, INC., North Salt Lake, UT (US)

(72) Inventor: William Niedermeyer, West Jordan, UT (US)

(73) Assignee: ATTOSTAT, INC., Salt Lake City, UT (US)

( * ) Notice: Subject to any disclaimer, the term of this patent is extended or adjusted under 35 U.S.C. 154(b) by 315 days.

(21) Appl. No.: 15/808,088

(22) Filed: Nov. 9, 2017

(65) Prior Publication Data

US 2018/0126463 A1 May 10, 2018

Related U.S. Application Data

(63) Continuation of application No. 14/298,594, filed on Jun. 6, 2014, now Pat. No. 10,137,503, which is a
(Continued)

(51) Int. Cl.
*B22F 9/04* (2006.01)
*B01J 13/00* (2006.01)
(Continued)

(52) U.S. Cl.
CPC .............. *B22F 9/04* (2013.01); *B01J 13/0043* (2013.01); *B82Y 40/00* (2013.01); *B22F 1/0018* (2013.01);
(Continued)

(58) Field of Classification Search
CPC .............. B22F 2202/05; B22F 2202/06; B22F 2202/11; B82Y 30/00
See application file for complete search history.

(56) References Cited

U.S. PATENT DOCUMENTS 3,133,023 A 5/1964 Vogel
4,515,740 A 5/1985 Schuttenberg et al.
(Continued)

FOREIGN PATENT DOCUMENTS

CA 2560837 3/2007
CN 101128550 2/2008
(Continued)

OTHER PUBLICATIONS

U.S. Appl. No. 15/976,447, filed May 10, 2018, Niedermeyer.
(Continued)

*Primary Examiner* — Michael A Salvitti
(74) *Attorney, Agent, or Firm* — Workman Nydegger

(57) ABSTRACT

An apparatus and process for creating uniformly sized, spherical nanoparticles from a solid target. The solid target surface is ablated to create an ejecta event containing nanoparticles moving away from the target surface. Ablation may be performed by laser or electrostatic discharge. At least one continuous planar electromagnetic field is placed in front of the solid target surface being ablated. The electromagnetic field manipulates at least a portion of the nanoparticles as they move away from the target surface and pass through the electromagnetic field to increase size and spherical shape uniformity of the nanoparticles. The manipulated nanoparticles are collected as a stable suspension in a fluid.

19 Claims, 7 Drawing Sheets

Related U.S. Application Data continuation of application No. 13/175,708, filed on Jul. 1, 2011, now Pat. No. 9,849,512.

(51) Int. Cl.
  *B82Y 40/00* (2011.01)
  *B22F 1/00* (2006.01)
  *B22F 3/00* (2006.01)

(52) U.S. Cl.
  CPC ......... *B22F 3/003* (2013.01); *B22F 2009/045* (2013.01); *B22F 2999/00* (2013.01); *Y10T 428/2982* (2015.01)

(56) References Cited

U.S. PATENT DOCUMENTS

| | | | |
|---|---|---|---|
| 5,047,448 A | 9/1991 | Tanaka | |
| 5,227,608 A | 7/1993 | Yoshida | |
| 5,390,864 A | 2/1995 | Alexander | |
| 5,585,020 A | 12/1996 | Becker et al. | |
| 5,677,075 A | 10/1997 | Fujita | |
| 6,051,279 A * | 4/2000 | Gualco | C23C 4/04 427/447 |
| 6,232,264 B1 | 5/2001 | Lukehart | |
| 6,239,453 B1 | 5/2001 | Yamada et al. | |
| 6,509,070 B1 | 1/2003 | Voevodin et al. | |
| 6,660,379 B1 | 12/2003 | Lakowicz | |
| 6,720,006 B2 | 4/2004 | Hanke | |
| 7,014,737 B2 | 3/2006 | Harutyunyan et al. | |
| 7,252,814 B2 | 8/2007 | De Mello | |
| 7,332,351 B2 | 2/2008 | Tan et al. | |
| 7,371,457 B2 | 5/2008 | Oldenburg et al. | |
| 7,374,730 B2 | 5/2008 | Simard et al. | |
| 7,384,560 B2 | 6/2008 | Martens et al. | |
| 7,449,679 B2 | 11/2008 | Plewa | |
| 7,509,993 B1 | 3/2009 | Turng et al. | |
| 7,527,824 B2 | 3/2009 | Becker | |
| 7,553,801 B2 | 6/2009 | Alexander et al. | |
| 7,625,637 B2 | 12/2009 | Kim | |
| 7,662,731 B2 | 2/2010 | Itoh et al. | |
| 7,682,970 B2 | 3/2010 | Grigoropoulos et al. | |
| 7,700,032 B1 | 4/2010 | Lu et al. | |
| 7,884,160 B2 | 2/2011 | Wang et al. | |
| 7,967,876 B2 | 6/2011 | Aradi | |
| 7,985,367 B2 | 7/2011 | Hiromatsu et al. | |
| 8,097,233 B2 | 1/2012 | Porterat | |
| 8,435,602 B1 | 5/2013 | Seal | |
| 8,490,586 B2 | 7/2013 | Gardenier | |
| 8,524,139 B2 | 9/2013 | Toth | |
| 8,685,293 B1 | 4/2014 | Coppa et al. | |
| 8,709,531 B2 | 4/2014 | Miller | |
| 8,802,234 B2 | 8/2014 | Che | |
| 8,883,865 B2 | 11/2014 | DiFrancesco | |
| 8,992,815 B2 | 3/2015 | Hu | |
| 9,434,006 B2 | 9/2016 | Niedermyer | |
| 9,463,510 B2 | 10/2016 | Hendi et al. | |
| 9,512,377 B2 | 12/2016 | Binder | |
| 9,627,713 B2 | 4/2017 | Moganty et al. | |
| 9,839,652 B2 | 12/2017 | Tarbet et al. | |
| 9,849,512 B2 * | 12/2017 | Niedermeyer | B22F 9/04 252/62.54 |
| 9,883,670 B2 | 2/2018 | Niedermeyer | |
| 9,885,001 B2 | 2/2018 | Niedermeyer | |
| 2001/0031564 A1 | 10/2001 | Suzuki et al. | |
| 2002/0051823 A1 | 5/2002 | Yan | |
| 2003/0012686 A1 | 1/2003 | Andersen et al. | |
| 2003/0086859 A1 | 5/2003 | Kawakami et al. | |
| 2003/0102099 A1 | 6/2003 | Yadav et al. | |
| 2003/0108612 A1 | 6/2003 | Xu | |
| 2003/0129320 A1 * | 7/2003 | Yu | C04B 38/009 427/453 |
| 2003/0228525 A1 | 12/2003 | Kozawa | |
| 2004/0103936 A1 | 6/2004 | Andriessen | |
| 2004/0214001 A1 | 10/2004 | Oldenburg et al. | |
| 2005/0061779 A1 | 3/2005 | Blumenfeld | |
| 2005/0061785 A1 | 3/2005 | Schroder | |
| 2005/0153071 A1 | 7/2005 | Bouvrette | |
| 2005/0247866 A1 | 11/2005 | Plewa et al. | |
| 2005/0258149 A1 | 11/2005 | Glukhoy | |
| 2005/0260276 A1 | 11/2005 | Yang et al. | |
| 2006/0049034 A1 | 3/2006 | Lee | |
| 2006/0142853 A1 | 6/2006 | Wang et al. | |
| 2007/0003603 A1 | 1/2007 | Karandikar | |
| 2007/0029185 A1 | 2/2007 | Tung | |
| 2007/0125196 A1 | 6/2007 | Zhong et al. | |
| 2007/0140951 A1 | 6/2007 | O'Brien | |
| 2007/0207335 A1 | 9/2007 | Karandikar | |
| 2007/0287202 A1 | 12/2007 | Maehashi et al. | |
| 2008/0006524 A1 | 1/2008 | Liu | |
| 2008/0035682 A1 | 2/2008 | Coffey et al. | |
| 2008/0044148 A1 | 2/2008 | Robinson | |
| 2008/0050448 A1 | 2/2008 | Wilson | |
| 2008/0143021 A1 | 6/2008 | Ehrentraut | |
| 2008/0161631 A1 | 7/2008 | Axtell et al. | |
| 2008/0241490 A1 * | 10/2008 | Newman | C04B 35/111 428/206 |
| 2008/0263940 A1 | 10/2008 | Parish et al. | |
| 2008/0292673 A1 | 11/2008 | Crudden | |
| 2009/0000186 A1 | 1/2009 | Sanders et al. | |
| 2009/0028947 A1 | 1/2009 | Rahman | |
| 2009/0039316 A1 | 2/2009 | Hirai | |
| 2009/0061230 A1 | 3/2009 | Berkei | |
| 2009/0104179 A1 | 4/2009 | Boyden | |
| 2009/0117268 A1 * | 5/2009 | Lewis | B05D 1/60 427/205 |
| 2009/0148484 A1 | 6/2009 | Lin et al. | |
| 2009/0175948 A1 | 7/2009 | Jiang | |
| 2009/0191288 A1 | 7/2009 | Squires | |
| 2009/0246530 A1 | 10/2009 | Murakami et al. | |
| 2010/0040655 A1 | 2/2010 | Ren et al. | |
| 2010/0050872 A1 | 3/2010 | Lee | |
| 2010/0068299 A1 | 3/2010 | van der Krieken et al. | |
| 2010/0072645 A1 | 3/2010 | Hiromatsu et al. | |
| 2010/0080957 A1 | 4/2010 | Chinn | |
| 2010/0092367 A1 | 4/2010 | Porterat | |
| 2010/0154591 A1 | 6/2010 | Islam | |
| 2010/0167958 A1 | 7/2010 | Lin | |
| 2010/0172997 A1 | 7/2010 | Omary | |
| 2010/0180413 A1 | 7/2010 | Jeong | |
| 2010/0183739 A1 | 7/2010 | Newman | |
| 2010/0187091 A1 | 7/2010 | Pierce et al. | |
| 2010/0196192 A1 | 8/2010 | Liu et al. | |
| 2010/0212221 A1 | 8/2010 | Aradi | |
| 2010/0255110 A1 | 10/2010 | Yoon | |
| 2010/0272650 A1 | 10/2010 | Tsukada | |
| 2010/0272770 A1 | 10/2010 | De Windt | |
| 2010/0301013 A1 | 12/2010 | Conneely | |
| 2011/0039078 A1 | 2/2011 | Brennan Fournet et al. | |
| 2011/0052460 A1 | 3/2011 | Coffey et al. | |
| 2011/0129536 A1 | 6/2011 | Donati | |
| 2011/0155643 A1 | 6/2011 | Tov | |
| 2011/0192450 A1 | 8/2011 | Liu | |
| 2011/0193025 A1 | 8/2011 | Ichikawa et al. | |
| 2011/0196044 A1 | 8/2011 | Hu | |
| 2011/0201527 A1 | 8/2011 | Lin | |
| 2011/0206753 A1 | 8/2011 | Karpov | |
| 2011/0228890 A1 | 9/2011 | Dean et al. | |
| 2011/0244056 A1 | 10/2011 | Santra | |
| 2011/0297653 A1 | 12/2011 | Ehrentraut | |
| 2012/0088066 A1 | 4/2012 | Aytug et al. | |
| 2012/0094036 A1 * | 4/2012 | Droege | C09D 7/70 427/600 |
| 2012/0124899 A1 | 5/2012 | Difrancesco | |
| 2012/0136164 A1 | 5/2012 | Ying et al. | |
| 2012/0138347 A1 | 6/2012 | Bahnmuller | |
| 2012/0138862 A1 | 6/2012 | Hogan | |
| 2012/0164073 A1 | 6/2012 | Xu et al. | |
| 2012/0174472 A1 | 7/2012 | Mills | |
| 2012/0183674 A1 | 7/2012 | Bonn-Savage | |
| 2012/0301528 A1 | 11/2012 | Uhlmann | |
| 2012/0301531 A1 | 11/2012 | Uhlmann et al. | |
| 2012/0313200 A1 | 12/2012 | Jackrel et al. | |
| 2012/0328701 A1 | 12/2012 | Edelson | |
| 2013/0078510 A1 | 3/2013 | Reynolds et al. | |

(56) References Cited

U.S. PATENT DOCUMENTS

| | | | |
|---|---|---|---|
| 2013/0116369 A1* | 5/2013 | Qi | G03G 15/2057 |
| | | | 524/157 |
| 2013/0152823 A1 | 6/2013 | El-Sayed | |
| 2013/0203849 A1 | 8/2013 | Ben Yehuda | |
| 2013/0224477 A1 | 8/2013 | Xu | |
| 2013/0273116 A1 | 10/2013 | Jespersen et al. | |
| 2013/0334104 A1 | 12/2013 | Marsh | |
| 2013/0337998 A1 | 12/2013 | Irving | |
| 2014/0024026 A1 | 1/2014 | Alocilja | |
| 2014/0221543 A1 | 8/2014 | Wang | |
| 2014/0274830 A1 | 9/2014 | Pol et al. | |
| 2014/0288194 A1 | 9/2014 | Niedermeyer | |
| 2014/0370293 A1 | 12/2014 | Johnson | |
| 2015/0008313 A1 | 1/2015 | Loboda | |
| 2015/0030919 A1 | 1/2015 | Koazawa | |
| 2015/0066135 A1 | 3/2015 | Boston Scientific Scimed | |
| 2016/0082514 A1 | 3/2016 | Niedermeyer | |
| 2016/0083146 A1 | 3/2016 | Niedermeyer | |
| 2016/0083901 A1 | 3/2016 | Niedermeyer | |
| 2016/0144350 A1 | 5/2016 | Aizenberg et al. | |
| 2016/0298243 A1 | 10/2016 | Tarbet et al. | |
| 2016/0372243 A1 | 12/2016 | Cassignol | |
| 2017/0129975 A1 | 5/2017 | Hallinan et al. | |
| 2017/0166485 A1* | 6/2017 | Hong | C04B 30/00 |
| 2017/0209490 A1 | 7/2017 | Niedermeyer | |
| 2018/0282852 A1* | 10/2018 | Soloway | C23C 4/134 |
| 2019/0225498 A1* | 7/2019 | Ruiz | B01J 2/08 |

FOREIGN PATENT DOCUMENTS

| | | |
|---|---|---|
| CN | 101415644 | 4/2009 |
| CN | 101716684 | 6/2010 |
| CN | 101932752 | 12/2010 |
| CN | 102120619 | 7/2011 |
| CN | 102753628 | 10/2012 |
| CN | 103796946 | 5/2014 |
| CN | 103891558 | 7/2014 |
| CN | 104014811 | 9/2014 |
| DE | 102005044360 | 3/2007 |
| EP | 2140958 | 1/2010 |
| EP | 2559436 | 2/2013 |
| JP | 2008527169 | 7/2008 |
| KR | 20060021749 | 3/2006 |
| WO | 2006026026 | 3/2006 |
| WO | 2006053225 | 5/2006 |
| WO | 2006062826 | 6/2006 |
| WO | 2008043396 | 4/2008 |
| WO | 2009025955 | 2/2009 |
| WO | 2009044146 | 4/2009 |
| WO | 2009046081 | 4/2009 |
| WO | 2009066011 | 5/2009 |
| WO | 2009091900 | 7/2009 |
| WO | 2011045627 | 4/2011 |
| WO | 2012082364 | 6/2012 |
| WO | 2013006430 | 1/2013 |
| WO | WO2013141879 | 9/2013 |
| WO | WO2014066850 | 5/2014 |
| WO | 2014096556 | 6/2014 |
| WO | 2014137352 | 9/2014 |
| WO | WO2016007113 | 1/2015 |
| WO | WO2016007112 | 1/2016 |

OTHER PUBLICATIONS

U.S. Appl. No. 16/012,508, filed Jun. 19, 2018, Niedermeyer.
Malvern, "The use of the Malvern Zetasizer for the measurement of Zeta Potential", article from the Internet, http://www.malvern.co.alLaboratory/zetaintm.htm> 10 pages, printed on Feb. 12, 2002.
Malvern, "Zeta Potential Theory, Dispersion stability", article from the Internet, http://www.malvern.co.uk/Laboratory/zettheo.htm >, 3 pages, printed on Feb. 12, 2002.
"NOAA Ocean Service Education,""Corals"", downloaded from https://oceanservice.noaa.gov/education/kits/corals/coral03_growth.html on Sep. 5, 2017."

"Leisure Pro,""Coral Identification: Types of Coral (Part 1—Hard Coral)"", downloaded from http://www.leisurepro.com/blog/explorethe-blue/coral-identification-types-of-coral-part-1 on Sep. 2017".
"International Coral Reef Initiative,""What are Corals"", downloaded from http://www.iciforum.org/about-on Sep. 5, 2017."
U.S. Appl. No. 16/012,508, filed Niedermeyer.
Hopp Bela et al, "Production of nanostructures on bulk metal samples by laser ablation for fabrication of low-reflective surfaces", applied physics a materials science & processing, Springer Berlin Heidelberg.
Yuteng Wan et al., "Modification of coral-like SnO2 nanostructures with dense TiO2 nanoparticles for a self-cleaning gas sensor", Talanta, vol. 99, pp. 394-403.
U.S. Appl. No. 15/415,562, filed Jun. 20, 2018.
U.S. Appl. No. 16/202,078, filed Nov. 27, 2018, Niedermeyer.
Hamm et al. "Ionic conductivity enhancement of sputtered gold nanoparticle-in-ionic liquid electrolytes", J Mater Chem A, 2014; 2(3): 792-803.
He et al. "Ionic liquid and nanoparticle hybrid systems: Emerging applications", 2017. Advances in Colloid and Interface Science, 2017; 244: 54-70.
Nakashima et al. "Preparation of fusion materials based on ionic liquids and cationic gold nanoparticles", Polymer Journal, 2015; 47:171-176.
Choudhury et al. "A highly reversible room-temperature lithium metal battery based on crosslinked hairy nanoparticles", Nature Communications, 2015; DOI: 10.1038/ncomms10101.
Gurevitch et al. "Nanocomposites of Titanium Dioxide and Polystyrene-Poly(ethylene oxide) Block Copolymer as Solid-State Electrolytes for Lithium Metal Batteries", Journal of the Electrochemical Society, 2013; 160(9): A1611-A1617.
Korf et al. "Piperidine tethered nanoparticle-hybrid electrolyte for lithium metal batteries", J Mater. Chem., 2014; 2: 11866-11873.
Lu et al. "Ionic-Liquid-Nanoparticle Hybrid Electrolytes: Applications in Lithium Metal Batteries", Angew. Chem. Int. Ed., 2014; 53: 488-492.
Pan et al. "Hybrid Electrolytes with Controlled Network Structures for Lithium Metal Batteries", Adv. Mater., 2015; 27: 5995-6001.
Tu et al. "Nanoporous Polymer-Ceramic Composite Electrolytes for Lithium Metal Batteries", Adv. Energy Mater., 2014; 4: 1300654.
Daissy Paredes, et al., "Synthesis, characterization, and evaluation of antibacterial effect of Ag nanoparticles against *Escherichia coli* OI57:h7 and methicillin-resistant *Staphylococcus aureus* (Mrsa)", Apr. 3, 2014, International Journal of Nanomedicine, p. 1717-1729.
Guangnian Xu, et al."Progress in preparation of nano-silver", 2019, Materials Review, vol. 24, No. 11, p. 139-142.
Xinxia Yue, et al., "Preparation of silver nanoparticles by tea extracts and its application in the antibacterial finishing of cotton fabric", 2014, Shanghai Textile Science & Technology, vol. 42, No. 5, p. 45-49.
U.S. Appl. No. 15/098,071, filed Aug. 8, 2019, Office Action.
U.S. Appl. No. 15/825,912, filed Jul. 15, 2019, Office Action.
U.S. Appl. No. 16/012,508, filed Dec. 11, 2018, Office Action.
U.S. Appl. No. 16/012,508, filed May 31, 2019, Office Action.
U.S. Appl. No. 15/825,912, filed Nov. 29, 2017, Tarbet et al.
Badawy et al., "Surface Charge-Dependent Toxicity of Silver Nanoparticles", Environ. Sci. Technol. 2011, 45, 283-287.
Barcikowski et al., "Generation of nanoparticle colloids by picosecond and femtosecond laser ablations in liquid flow", Appl. Phys. Lett. 91, 083113 (2007).
Chien et al., "Synthesis of nanoparticles: sunlight formation of gold nanodecahedra for ultra-sensitive lead-ion detection", Green Chem., vol. 13, pp. 1162-1166, May 2011.
Hultin, "A Guide to Solvents and Reagents in Introductory Organic Chemistry for students in 2.222", Obtained from https://home.cc.umanitoba.ca/~hultin/chem2220/Support/solvents_and_reagents.pdf on Jan. 25, 2018, originally published Feb. 12, 2002—17 pages.
International Search Report for PCT App. No. PCT/US2012/044907 dated Jan. 13, 2013.
International Search Report for PCT App. No. PCT/US2015/051642 dated Dec. 14, 2015.
International Search Report for PCT App. No. PCT/US2015/051639 dated Dec. 17, 2015.

(56) References Cited

OTHER PUBLICATIONS

International Search Report for PCT App. No. PCT/US2015/051640 dated Dec. 17, 2015.
International Search Report for PCT App. No. PCT/US2015/051643 dated Dec. 17, 2015.
International Search Report for PCT App. No. PCT/US2015/051649 dated Dec. 17, 2015.
International Search Report for PCT App. No. PCT/US2015/051646 dated Dec. 18, 2015.
Jacobson, "These six diseases should worry you more than Ebola", Inside Energy Oct. 2014; [online] retrieved on Jan. 29, 2017 from http://www.pbs.org/newshour/updates/six-diseases-actually-worry/; 10 pages.
Jana et al., "Seeding Growth for Size Control of 5-40 nm Diameter Gold Nanoparticles", Langmuir 2001, 17, 6782-6786.
Liu et al., "A novel coral-like porous SnO2 hollow architecture: biomimetic swallowing growth mechanism and enhanced photovoltaic property for dye-sensitized solar cell application", Chem. Commun., vol. 46, pp. 472-474, 2010.
Mafuné et al., "Formation of Stable Platinum Nanoparticles by Laser Ablation in Water", J. Phys. Chem. B 2003, 107, 4218-4223.
Mycozil, "The Benefits of Colloidal Silver for Toenail Fungus", http://www.nailfungustoenail.com/benefitsofcolloidalsilverfortoenailfungus.html.
Pal et al., "Does the Antibacterial Activity of Silver Nanoparticles Depend on the Shape of the Nanoparticle?", Applied and Environmental Microbiology, 2007; 73(6): 1712-1720.
Phuoc et al, "Synthesis of Ag-deoionized water nanofluids using multi-beam laser ablation in fluids", Optics and Lasers in Engineering 45 (2007) 1099-1106.
Prabhu et al., "Silver nanoparticles: mechanism of antimicrobial action, synthesis, medical applications, and toxicity effects", International Nano Letters, 2012, 2:32, pp. 1-10.
Rawashdeh et al., "Antibacterial Mechanisms of Metallic Nanoparticles: A Review", Dynamic Biochemistry, Process Biotechnology and Molecular Biology 2009 pp. 12-20.
Riabinina et al., "Influence of pressure on the Pt nanoparticle growth modes during pulsed laser ablation", Journal of Applied Physics 108, 034322 (2010, published online Aug. 12, 2010).
Sahu et al., "Flower Shaped Silver Nanostructures: An Efficient Bacteria Exterminator", A Search for Antibacterial Agents; Chapter 2; [online] retrieved from: http://www.intechopen.com/books/a-search-for-antibacterial-agents; 2007; 73(6): 1712-1720.
Santos et al., "Enhancemetn of antibiotic effect via gold:silver-alloy nanoparticles", J. Nanopart Res (2012) 14:859, pp. 1-8.
Sylvestre et al., "Surface Chemistry of Gold Nanoparticles Produced by Laser Ablation in Aqueous Media", J Phys. Chem. B 2004, 108, 16864-16869.
Sweeney et al., "Rapid Purification and Size Separation of Gold Nanoparticles via Diafiltration", J. Am. Chem. Soc. 2006, 128, 3190-3197 (Published on web Feb. 18, 2006).
Theodorou et al., "Inhalation of Silver Nanomaterials—Seeing the Risks", International Journal of Molecular Sciences, 2014, 15, 23936-23974.
U.S. Appl. No. 13/175,708, filed Jul. 1, 2011, Office Action dated May 30, 2014.
U.S. Appl. No. 13/175,708, filed Jul. 1, 2011, Final Office Action dated Nov. 13, 2014.
U.S. Appl. No. 13/175,708, filed Jul. 1, 2011, Office Action dated Jul. 6, 2015.
U.S. Appl. No. 14/861,243, filed Sep. 22, 2015, Office Action dated Mar. 9, 2016.
U.S. Appl. No. 13/175,708, filed Jul. 1, 2011, Final Office Action dated Mar. 28, 2016.
U.S. Appl. No. 14/861,318, filed Sep. 22, 2015, Office Action dated Apr. 25, 2016.
U.S. Appl. No. 14/861,318, filed Sep. 22, 2015, Notice of Allowance dated May 20, 2016.
U.S. Appl. No. 14/861,318, filed Sep. 22, 2015, Corrected Notice of Allowance dated Jun. 15, 2016.
U.S. Appl. No. 14/861,243, filed Sep. 22, 2015, Final Office Action dated Jul. 26, 2016.
U.S. Appl. No. 14/861,442, filed Sep. 22, 2015, Office Action dated Sep. 29, 2016.
U.S. Appl. No. 14/861,243, filed Sep. 22, 2015, Office Action dated Nov. 2, 2016.
U.S. Appl. No. 14/861,562, filed Sep. 22, 2015, Office Action dated Dec. 7, 2016.
U.S. Appl. No. 14/861,243, filed Sep. 22, 2015, Final Office Action dated Jan. 27, 2017.
U.S. Appl. No. 15/088,863, filed Apr. 1, 2016, Office Action dated Feb. 3, 2017.
U.S. Appl. No. 13/175,708, filed Jul. 1, 2011, Office Action dated Feb. 10, 2017.
U.S. Appl. No. 14/861,442, filed Sep. 22, 2015, Final Office Action dated Feb. 22, 2017.
U.S. Appl. No. 14/298,594, filed Jun. 6, 2014, Office Action dated Mar. 21, 2017.
U.S. Appl. No. 15/415,562, filed Jan. 25, 2017, Office Action dated May 23, 2017.
U.S. Appl. No. 14/861,562, filed Sep. 22, 2015, Final Office Action dated Jun. 23, 2017.
U.S. Appl. No. 15/088,863, filed Apr. 1, 2016, Final Office Action dated Jul. 11, 2017.
U.S. Appl. No. 14/861,442, filed Sep. 22, 2015, Office Action dated Aug. 23, 2017.
U.S. Appl. No. 15/415,562, filed Jan. 25, 2017, Office Action dated Sep. 5, 2017.
U.S. Appl. No. 14/861,375, filed Sep. 22, 2015, Office Action dated Sep. 8, 2017.
U.S. Appl. No. 14/861,500, filed Sep. 22, 2015, Office Action dated Sep. 22, 2017.
U.S. Appl. No. 14/861,243, filed Sep. 22, 2015, Office Action dated Sep. 25, 2017.
U.S. Appl. No. 14/298,594, filed Jun. 6, 2014, Final Office Action dated Oct. 17, 2017.
U.S. Appl. No. 15/415,562, filed Jan. 25, 2017, Office Action dated Jan. 31, 2018.
U.S. Appl. No. 14/861,243, filed Sep. 22, 2015, Final Office Action dated Feb. 2, 2018.
Thanaa Majied Al-Nori, "Antibacterial activity of Silver and Gold Nanoparticles against *Streptococus, Staphylococcus aureus* and *E.coli*", A1- Mustansiriya J. Sci, Vo. 23, No. 3, 2012.
Kewal K. Jain Md, Fracs, FFPM., "The Handbook of Nanomedicine" Humana Press, 2008.
International Search Report cited in PCT/US18/62864 dated Nov. 28, 2018.
Xiang Dongxi, "Study of Silver—nanoparticles on antiviral action", Journal of Dalian Medical University, vol. 31, No. 6, 2009.

* cited by examiner

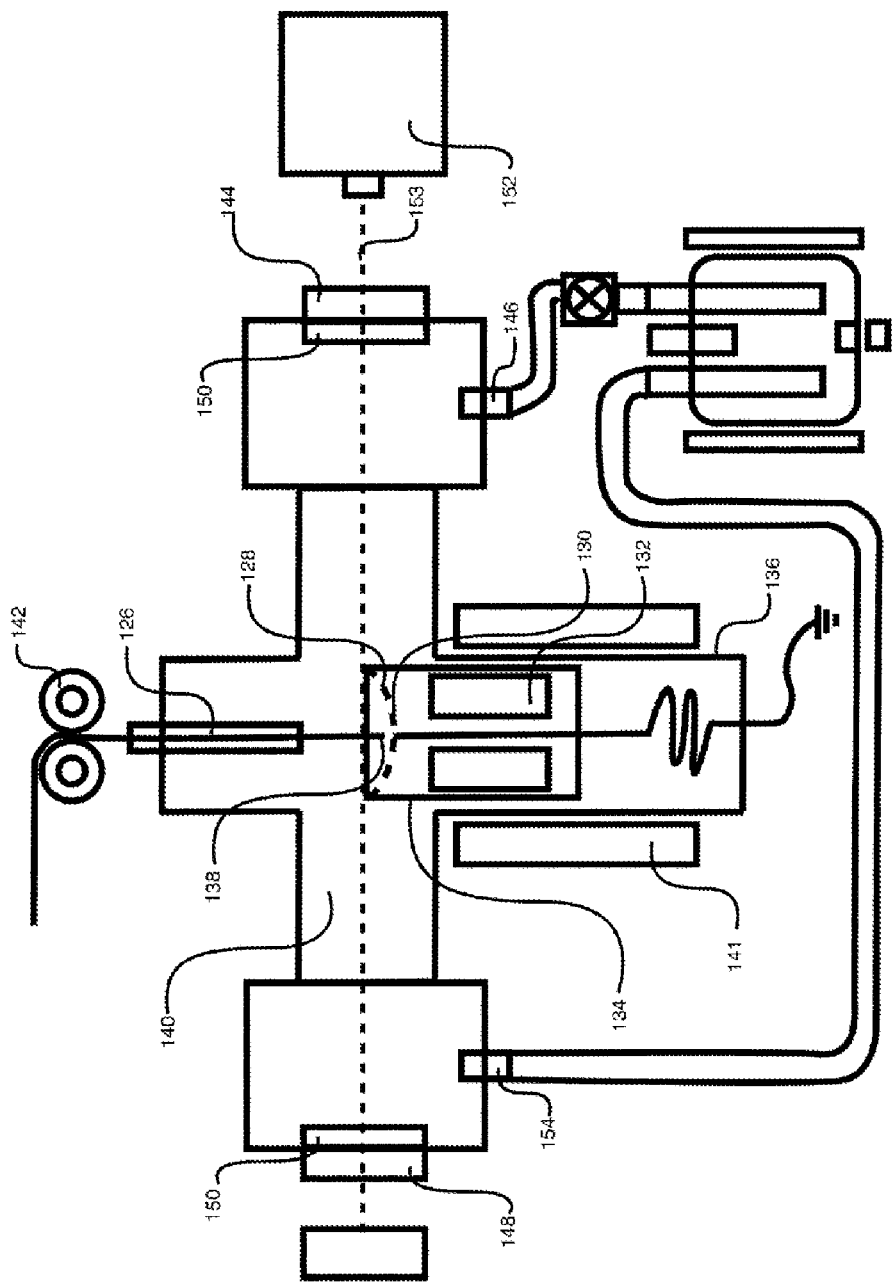

METHOD AND APPARATUS FOR PRODUCTION OF UNIFORMLY SIZED NANOPARTICLES

CROSS REFERENCE TO RELATED APPLICATION

This Application is a continuation of U.S. patent application Ser. No. 13/175,708, filed Jul. 1, 2011, now U.S. Pat. No. 9,849,512, the disclosure of which is incorporated by reference in its entirety.

TECHNICAL FIELD OF THE INVENTION

The present invention relates to novel processes and apparatus for the preparation of uniformly sized nanoparticles of various shapes. Because of the ability to produce uniformly sized nanoparticles, these particles exhibit unique characteristics in liquid solutions due to their ability to remain suspended in solution without the need for surfactants or other stabilizing agents.

BACKGROUND OF THE INVENTION

Over the past two decades substantial effort has been directed to the creation and study of what are commonly called nanoparticles, despite the fact that numerous definitions of what qualify as so-called nanoparticles exist. Under the broadest definition, any particle having one dimension measuring less than 100 nanometers (nm) (or <100×10-9 m) can qualify as a "nanoparticle" despite the fact that other dimensions of that particle may be quite large. Even for a particle for which every dimension measures less than 100 nm, the designation of "nanoparticle" does not provide information related to particle shape or its fundamental properties, which may or may not differ from the solid material from which it is made. Additionally, prior to the widespread use of the term "nanoparticle," very small particles, some of which would qualify under the standard definition of "nanoparticles," were often referred to as colloidal, which generally meant that they were merely small enough to exhibit Brownian motion, although whether that effect resulted from the particle size or other properties such as surface tension was rarely specified.

Today particles that qualify as nanoparticles under one or more traditional definition are used in multiple industrial, medical and consumer products, and interest in their properties and methods of production continues to increase.

Various processes to produce what are referred to as "nanoparticles" are known in the art. For example, U.S. Pat. No. 5,585,020, issued to Becker et al., teaches methods for creation of nanoparticles in what is considered a "narrow size distribution" (e.g., particles with an average diameter of 73 nm with a standard deviation of 23 nm). This method utilizes laser ablation of initial diameter target particles of less than 100 microns within an inert gas or vacuum system.

U.S. Pat. No. 7,374,730 teaches methods for creation of nanoparticles within organic liquid medium and recognizes the need for stabilizing agents such as surfactants or coating agents or other hydrocarbon materials capable of preventing coalescence of the nanoparticles or otherwise preventing the growth of the nanoparticles into larger entities.

U.S. Pat. No. 7,662,731 recognizes the need to prevent oxidation during laser sputtering/ablation, but solves this by carrying out the ablation in superfluid helium.

Picosecond ablation provides shorter pulses that reduce the time for ions to form and allows a method to control size, although the power output of picosecond ablation is generally significantly small, limiting quantities of material produced with relatively small ablation material plumes.

The shape of nanoparticles is also a significant characteristic and is a necessary characteristic in defining how a nanoparticle acts, interacts, or can be acted upon. Spherical particles are desirable for their uniform shape and repeatable characteristics.

Some nanoparticles can be grown into spheres through chemical reduction methods (e.g., silica), while production of spherical nanoparticles from other starting materials has traditionally been through a two-step process. Typically, growth of nanoparticles from non-silica starting materials by the similar chemical reduction methods produce non-spherical shapes such as hedrons, platelets, rods, and other non-spherical shapes. While these methods provide good control for size, the resulting non-spherical shapes require further processing before they can become spherical in shape. Once the specifically shaped nanoparticles have been created, laser ablation is utilized to aggressively mill them into quasi-spherical and/or spherical shapes. This process produces what could be called scrap material that is knocked off of the original non-spherical particles, and in many instances this scrap lacks the intranuclear bonding energy to be cohesive in the carrier medium resulting in ion production. The spherical particles are then filtered to remove the ions and unwanted scrap. Although desired spherical nanoparticles are achieved by this method, the process is limited in its production capacity by the size of ablation field and by the batch process of precursor materials.

Due to the relatively recent advances in nanomaterial science and research, as well as, the identification of unique properties related to specific nanomaterials, standardizations for nanomaterial characteristics are continuing to develop. In the present application, the term "nanoparticle" will be used to refer to particles of any shape having its largest dimension less than 100 nm.

Significantly absent in the art are methods capable of producing high volume, uniformly sized, ionically stable, nanoparticles, and particularly spherical nanoparticles. Further absent from the art are methods for producing nanoparticles that can be suspended within a liquid solution and more particularly within a polar liquid solution without the need for surfactant or other stabilizing additives.

BRIEF SUMMARY OF THE INVENTION

The present disclosure relates to novel processes and apparatus for the preparation of uniformly sized and stable nanoparticles. In one non-limiting embodiment, processes and apparatus for preparing uniformly sized, ionically stable spherical nanoparticles are disclosed. In one embodiment within the scope of the invention, when these nanoparticles are suspended within a liquid medium no surfactants or other separation agents are required to maintain suspension and stability of the particles. As described further below, these processes and apparatuses are particularly effective in creating uniformly sized spherical nanoparticles from a wide range of materials. Such materials include, but are not limited to, metals, both individual elemental metals and alloys, as well as solid nonmetallic starting materials, including individual elements, compounds and polymers.

The first step in the creation of these uniformly sized and spherical shaped nanoparticles is ablation of a target surface to create an ejecta event, which moves radially away from the surface of a target material. In a heavy atmosphere, i.e. a fluid medium, this ejecta event will be what is known as an ejecta plume that has a Knudsen boundary layer separating the vapor within the plume (which contains the ejecta material) from the heavy atmosphere. In a vacuum, this ejecta event would be what is known as an ejecta spray. This is preferably accomplished by delivering a specific energy packet (typically photon or electric energy) to the target surface, that when transferred becomes phonon energy within the target surface sufficient to break the intranuclear bonds around small clusters of atoms, and ejecting clusters away from the target surface in an ejecta event but doing so at a rate which reduces residual heat within the target material that may lead to ion production. It should be understood that changing the physical properties of the target material will affect the ablation rate of that target. For example, annealed metal targets such as silver (Ag) have reduced intranuclear bonding energies and thus produce particles at higher rates from a constant energy delivered.

Known techniques in the art for creation of an ejecta event include the use of laser ablation as well as electrical discharge. By knowing the bonding energy between the atoms or molecules of a given target, the absorption band of energy for the target material, and the ionization energy of metallic target material, a specific energy packet can be delivered to the target material, which is sufficient to break the intranuclear bonds, but not sufficient to create heat which results in ion formation from metallic targets.

In a laser ablation system, the target material will typically have known wavelength absorption bands, and the delivered energy packet content to ablate the target material is known or can be determined through known testing parameters. The profile of the laser emission can be selected to provide the most efficient transfer of photonic energy to phonon energy within the target, such as the well-known "top hat" or "gaussian" profiles, and can be further tuned to deliver photonic energy packets of a specific time duration within an overall controlled area for an energy density that induces specific ejecta event shape, size, and density of ejecta material. Similarly, in an electrical discharge system, bursts of electrical energy from the tip of a target anode creates the ejecta plume near the cathode surface. Control of the electrical energy packet content to the target surface will control the ejecta plume size and density of ejecta material.

For processes to create the desired stable spherical nanoparticles by laser ablation methods, the laser pulse length and energy of a given delivered photonic energy packet, are typically measured in times of no greater than nanoseconds. Energy packets from electrical discharge methods for desire stable spherical nanoparticles are typically measured in hundreds of volts, with pulse lengths no greater than microseconds.

As the ejecta event leaves the ablation target surface it will contain a distribution of highly energized and generally nonionic particles ranging in size from small clusters of a few atoms/molecules to large particles containing hundreds and even thousands of atoms/molecules. In the case of metallic targets the initial ejecta event will likely also contain a small amount of individual atoms, although minimization of heat created in the target surface by the relatively short pulse length of the photonic energy packet will act to minimize such single atom production or ions. Not only can this mixture of particles lack uniform size and shape for the particles, the zeta-potential ($\xi$-potential) of these particles is low (<±8 mV). As a result, even with ions removed, the nonuniform forces between these particles create instability, which can either result in particle disassociation into individual ions or agglomeration of particles together leading to precipitation out of a holding media thereby significantly reducing the quantity of nanoparticles in a holding media.

Stability of the particles in a holding media is substantially increased through uniformity of particle size and imparting $\xi$-potential>±20 mV, and is achieved through the use of at least one electromagnetic energy field, and more preferably a gradient electromagnetic field composed of multiple discrete fields of varying energy strength. This at least one electromagnetic field is generally parallel to the target surface and therefore generally perpendicular to the direction of the expanding ejecta event. Specifically if the ablation laser is designated as the x-axis, then the electromagnetic energy field will form y-z planes in front of the target material. Without being bound by theory, this field, or combination of multiple fields, will act on the clusters within the ejecta event, where sufficient phonon energy within clusters still exists, to induce uniformity of particle size by both causing large particles to split as well as causing small clusters of atoms to agglomerate with other particles, thereby causing the composite particle size distribution to narrow.

The size of the spherical nanoparticles that will remain stable in a given environment is a function of bonding energies of atoms or molecules within a geometric effect of the particle compared to the disassociation energies of the particle's environment. As used herein, the term geometric effect of the particle means where the surface exhibits uniform radial curvature characteristics (as opposed to planar for large particles or point characteristics for small particles). Stability of the spherical nanoparticle, meaning that the particle is not susceptible to significant mass loss by ions or clusters of atoms leaving the spherical nanoparticle, is believed to be achieved because the combined bonding energy (b) resulting from the uniform geometric effect is greater than the thermal energy of the medium (m). As such, for materials such as gold (Au) and platinum (Pt), whose bonding energy is relative high, stable particles having diameters as low as 1 nm have been observed in polar liquids such as water compared to silver (Ag), where stability is typically not maintained until 2.5-5 nm diameters. It has also been observed that once the particle sizes of most material exceeds about 35 nm the particles exhibit more planar geometric effects leading to ionization because atoms/molecules at the surface exhibit localized reduced bonding behavior rather than the group geometric effect of a stable spherical nanoparticle.

In one disclosed embodiment, the gradient electromagnetic energy fields could be designed to not only narrow the particle size distribution, but to also create generally spherical particles without any discrete corners or points.

Further, while the electromagnetic field in front of the target may be limited to a single energy field, in some embodiments, this field can include at least three, and more preferably at least four, fields of varying levels of energy. These multiple fields can be created for example by using diffraction optics to divide a single laser emission or through the use of multiple gradient electrical fields. Size, range and distribution of the nanoparticles are influenced by the wavelength and energy of the electromagnetic field(s) sufficient to act upon the energized particles within the ejecta event as the ejecta event expands through the electromagnetic field(s). Without being bound by theory, it is believed the closer the electromagnetic field(s) can be placed to the beginning of the ejecta event, or surface of the target, where the clusters of ejected target material are more dense and energetic, the better the clusters are able to be acted upon by the electromagnetic field(s). Specific characteristics in the electromagnetic field(s) of wavelength and energy density have uniforming effects on the ejecta clusters resulting in narrowing size distribution and overall size and shape of the nanoparticles.

Particles within an ejecta event leave the target highly energized and can initially move at or near sonic velocity as they expand radially away from the target surface. The velocity in an ejecta plume is affected by the pressure of the heavy atmosphere around the target, with higher pressures or viscosities causing a more rapid decrease in the velocity of the particles. As such, under typical conditions, the particles within the event continue to spread away from each other with little incentive or compulsion for any combination or other interaction and without any additional energy applied to the particles. However, in the present invention as the ejecta event begins its radial expansion away from the target surface it encounters an electromagnetic field and in some embodiments multiple such fields. It is believed that the wavelength and energy of these discrete electromagnetic fields induces a uniforming effect which results in nanoparticles of the same size and plasmon resonance to a point that the electromagnetic fields have a limited effect on the nanoparticles because they have reduced absorption of energy by the electromagnetic fields of specific frequency and maintain the same size and plasmon resonance.

This process yields generally spherical nanoparticles of uniform size, meaning that at least 99% of the particles will have diameters within preferably ±3 nm, and most preferably within <±1 nm in diameter. Additionally the particles possess high ξ-potential (preferably >±30 mV). This means that when suspended within any medium, including any polar liquid such as water, these particles exert uniform forces on each other and thereby remain suspended in solution without the need for any added surfactants. The lack of surfactants now allows introduction of these particles into applications where the presence of the surfactants would otherwise prove problematic, such as biological systems.

Given that a single ablation step on a target will dislodge a miniscule amount of material from the target surface, the process for obtaining a useable quantity of uniformly sized nanoparticles will also include the capacity to perform numerous ablations on the target, ideally over a relatively short time, as well as the ability to collect the particles in a useable volume or space. When utilizing laser ablation this can be accomplished within a reaction chamber which allows a primary ablation laser to scan and repeatedly ablate a target surface and which further allows a secondary cross laser that has preferably been split with diffraction optics or using multiple lasers (whether of different or similar energy densities), to provide the gradient electromagnetic fields. Input and output ports on the chamber allow a heavy atmosphere, whether gas or liquid, to carry away the nanoparticles after they have passed through the electromagnetic fields. Similarly, in a vacuum system, the particles of the ejecta spray will be deposited typically on the chamber wall opposite of the target.

Additionally, in circumstances where a liquid is recirculated through the chamber to allow nanoparticle concentrations to build up, by minimizing the volume of solution in front of the target continued destruction of the particles by the ongoing laser energy can be minimized.

These and other advantages and novel features of the invention will be set forth in part in the description which follows, and in part will become apparent to those skilled in the art upon examination of the following or may be learned by practice of the invention.

BRIEF DESCRIPTION OF THE DRAWINGS

FIG. 7 is a drawing of a preferred embodiment of an apparatus for performing the process of the present invention using electrical discharge.

DETAILED DESCRIPTION OF THE PREFERRED EMBODIMENTS

The present invention relates to novel processes and apparatus for the preparation of uniformly sized and spherical-shaped nanoparticles. As described further below, these processes and apparatus are effective in creating nanoparticles, specifically spherical nanoparticles from a wide range of materials, including metals, both individual elemental metals and alloys, and nonmetallic starting materials, including polymers.

Figure 1:
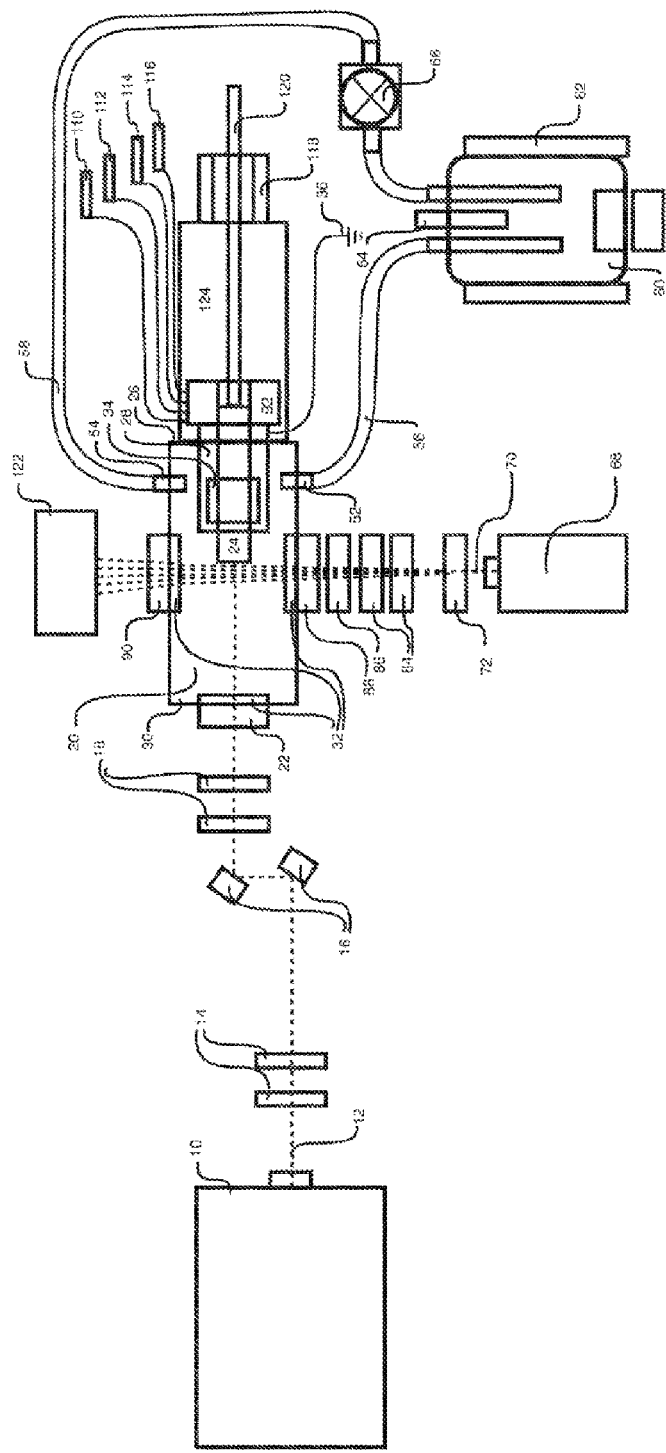
FIG. 1 is a drawing of a preferred embodiment of an apparatus for performing the process of the present invention using laser ablation.

FIG. 1 shows an example of apparatus utilized within a system for producing uniformly sized nanoparticles using laser ablation. A primary laser 10 emits or delivers discrete energy packets of photon energy in a pulsed manner 12. Typically the diameter of laser pulse emission 12 exiting the primary laser 10 is expanded through beam expanding optics 14 to reduce the power density to allow the emission to move through scanning optics 16 without destroying the optic coatings. After leaving the scanning optics 16 the laser emission 12 then typically passes through beam collimating optics 18 to create the desired spot size for laser emission 12 as it enters a chamber 20 through an optic window 22 and interacts with the target 24. The scanning optics 16 adjust the direction of emission 12 slightly for each pulse to move emission 12 around the surface of the target 24 and typically are either polar or x-y scanners. This precludes the laser emission 12 from repeatedly striking the exact same location on target 24 thereby allowing for optimal particle ablation during each pulse and providing as efficient utilization of the target as practically possible. Significantly, whether the target moves or the energy beam moves is less important than precluding repeated energy delivery to the same point on the target. Further, one skilled in the art will recognize that the path of laser emission 12 preferably will occur within a hermetically sealed environment to preserve the integrity of laser beam profile (typically either a "top hat" or Gaussian profile).

The type and frequency of primary laser 10 is primarily a function of the target material to be ablated as well as considerations of commercial availability and cost of the primary laser. Typically the target material will typically have known wavelength absorption bands. Where no known absorption wavelength absorption bands exists for a given target material or where further optimization from reported values is desired, the frequency for primary laser 10 can be experimentally determined by finding a suitable and strong absorption band for the specific material to be ablated.

Further, the beam spot size and energy density will control the total energy delivered (ET) in each energy packet or pulse for emission 12. This will be a function both of the target material's bonding energy (EB) as well as the number of total atoms/molecules to be contained within the desired final spherical nanoparticle.

The pulse duration for laser emission 12 preferably will allow delivery of sufficient energy within each pulse or energy packet to ablate the target material, while still maintaining energy content of the pulse below the ionization energy of the target. This maximum pulse duration (PD) will be particularly significant in the instance of metallic targets and again can be determined experimentally or by dividing the target ionization energy ($E_I$—in joules) by the total energy delivered from emission 12 ($E_T$—in joules/sec) as shown:

$$PD = E_I/E_T$$

For example, typically for preparation of spherical silver (Ag) nanoparticles with diameters less than 35 nm the pulse duration (PD) for creation of a suitable ejecta event has been found to be less than 10 nanoseconds.

The profile of the laser beam can be selected to provide the most efficient transfer of photonic energy to phonon energy within the target, such as the well-known "top hat" or "Gaussian" profiles, and can be further tuned to deliver photonic energy packets of a specific time duration within an overall controlled area for an energy density that induces specific ejecta event shape, size, and density of ejecta material.

As further shown in FIG. 1, the target 24 is preferably held within the hollow reactor chamber 20 at the back end 26 of that chamber by a target holder 28. The front end 30 of chamber 20 also contains a front optic 22, which allows emission 12 to pass through on its way to target 24. Preferably, a small piezo-electrically controlled vibrator 32 is mounted inside the front end of the chamber 30 behind the front optic 22 such that its regular vibration precludes buildup of nanoparticles on it, thereby protecting the front optic 22. If nanoparticle buildup occurs on the front optic 22 then propensity for damage to the optic from the incoming laser emission increases. The hollow interior of chamber 18 acts to contain the ejecta event (not shown) as that plume leaves the surface of target 24 after being impacted by each pulse from emission 12.

Once a pulse from emission 12 interacts with the surface of target 24, the energy of the laser photons transfers into the lattice structure of the target becoming phonon energy, which breaks the intranuclear bonds within the lattice structure and releases particles from the target surface. Because the bonding energies between the atoms within the lattice structure control the quantity of material that is ablated by a specific quantity of energy delivered to the target surface, lower bonding energies between atoms result in more rapid target material ablation. This means that processes to "soften" a target, such as annealing, have been found to significantly increase the rate of a target's ablation. Additionally, in a preferred embodiment the target 24 can be heated by a target heater 34, which will typically increase the temperature of target 24 by approximately 10° C. over ambient conditions to further decrease the bonding energies within the target's lattice structure.

Despite the attempt to control the energy delivered to the target surface to cause formation of specifically sized particles as discussed above, the particles of an ejecta event typically will contain a distribution of uncharged, nonionic particles ranging in size from small clusters of single digit atoms/molecules to particles of the generally desired size as well as many even larger particles. Further, in the case of metallic targets even with the laser energy delivered to the target being less than the target's ionization energy, the initial ejecta event will likely also contain some ionized, individual atoms. As such, metallic targets are preferably charged as an anode and grounded through an electrical outlet 36 so that ablated ionized atoms are drawn back into the target and reabsorbed into the target crystalline structure, thereby eliminating any free ions from the ejecta event and subsequently produced nanoparticles.

In order to facilitate continuous production and removal of the ablated particles, chamber 20 typically contains a fluid input port 52 and fluid output port 54 which are connected through input 56 and output 58 tubing or piping or other similar structures to a tank 60 or other similar holding vessel or chamber that contains the desired fluid, whether liquid or gas or other heavy atmosphere. The temperature of the fluid within tank 60 can be controlled through the use of a heating jacket 62 or other known mechanisms and preferably will contain a mechanism for mixing the fluid, whether by stirring or other mechanism. In systems utilizing liquids, the pressure within the chamber can be controlled by adjusting the height of the output port 54. The pressure in gas systems can be controlled by controlling the gas pressure. Similarly, in vacuum systems, the creation and maintenance of the vacuum within the system will operate with commonly understood components. Tank 60 can further include a sample port 64, which could also include sensors for temperature, pressure and/or fluid volume. Further, one skilled in the art will recognize and understand that all material surfaces within the chamber, input and output ports, tubing or piping and tanks must be nonreactive, non-attractive and non-absorbent to or with the specific nanoparticles being created. For example, untreated glass and quartz will readily absorb many types of nanoparticles, particularly metallic particles and pose substantial problems for use as materials for the reaction chamber 20. Preferred materials include teflon, PEEK, and PET. Further, where a pump 66 is needed for a liquid system peristaltic pumps are preferred.

Preferably flow rates will be maintained at low linear velocities above target 24 to provide laminar flow through reaction chamber 20 so as to allow the particles within the ejecta event to interact with the gradient electromagnetic field(s) without interference from the fluid flow. Additionally, by minimizing the distance between target 24 and the front 30 of reaction chamber 20, the volume of solution in front of target 24 through which emission 12 will pass will be minimized. Over time, the quantity of uniformly sized nanoparticles that have passed through the gradient electromagnetic field(s) will increase within the fluid. Since emission 12 must pass through this fluid above target 24, emission 12 has the capacity to further split the particles contained within the fluid. By minimizing the volume above target 24, the quantity of particles that can potentially interact with emission 12 are reduced and, as such, continued destruction of the particles by the ongoing laser energy of pulsed laser 10 can be minimized.

Figure 2:
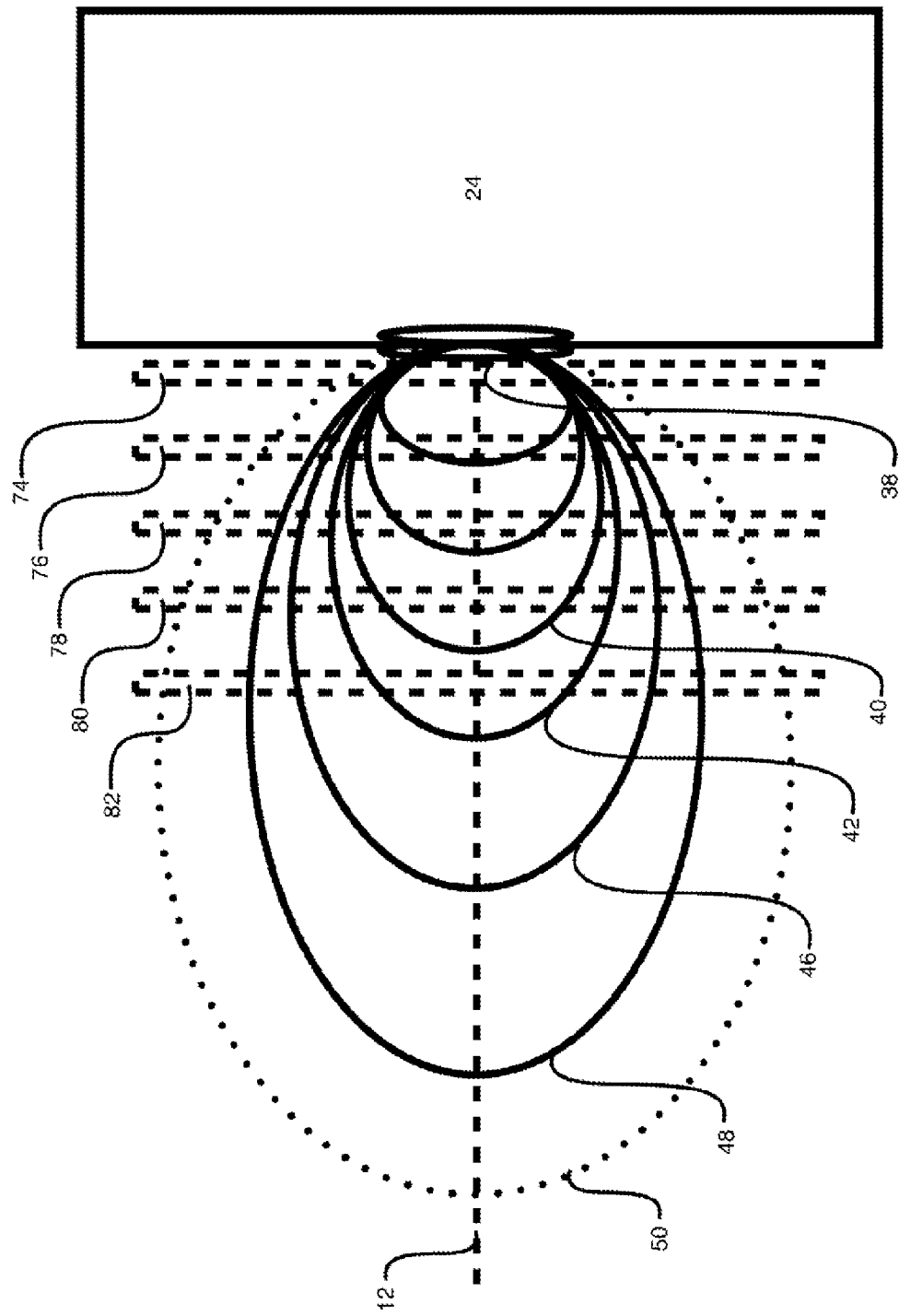
FIG. 2 is a depiction of an ejecta plume within a heavy atmosphere moving away from a target surface and its interaction with multiple gradient electromagnetic fields.

The energy packed delivered to the target 24 and the target's bonding energies will be the primary control factors for the initial particle size distribution within the ejecta event, which initial particle size distribution will largely control the size of particles ultimately produced. FIG. 2 illustrates the behavior of ablated particles within an ejecta plume within a heavy atmosphere as they leave the surface of a target (i.e., not in a vacuum system which would have an ejecta spray not an ejecta plume). Because the embodiment of FIG. 1 presumes the utilization of a heavy atmosphere, as the laser emission 12 interacts with the target 24, the ablated particles form an initial ejecta plume containing discrete ejecta material within the a Knudsen boundary layer 38 (which boundary layer would not exist in a vacuum system). This Knudsen boundary layer then proceeds to expand away from the surface of target 24 over time as shown by the boundary layers 40-48 until the ejecta plume looses all definition and the Knudsen boundary layer no longer exists 50.

Figure 3:
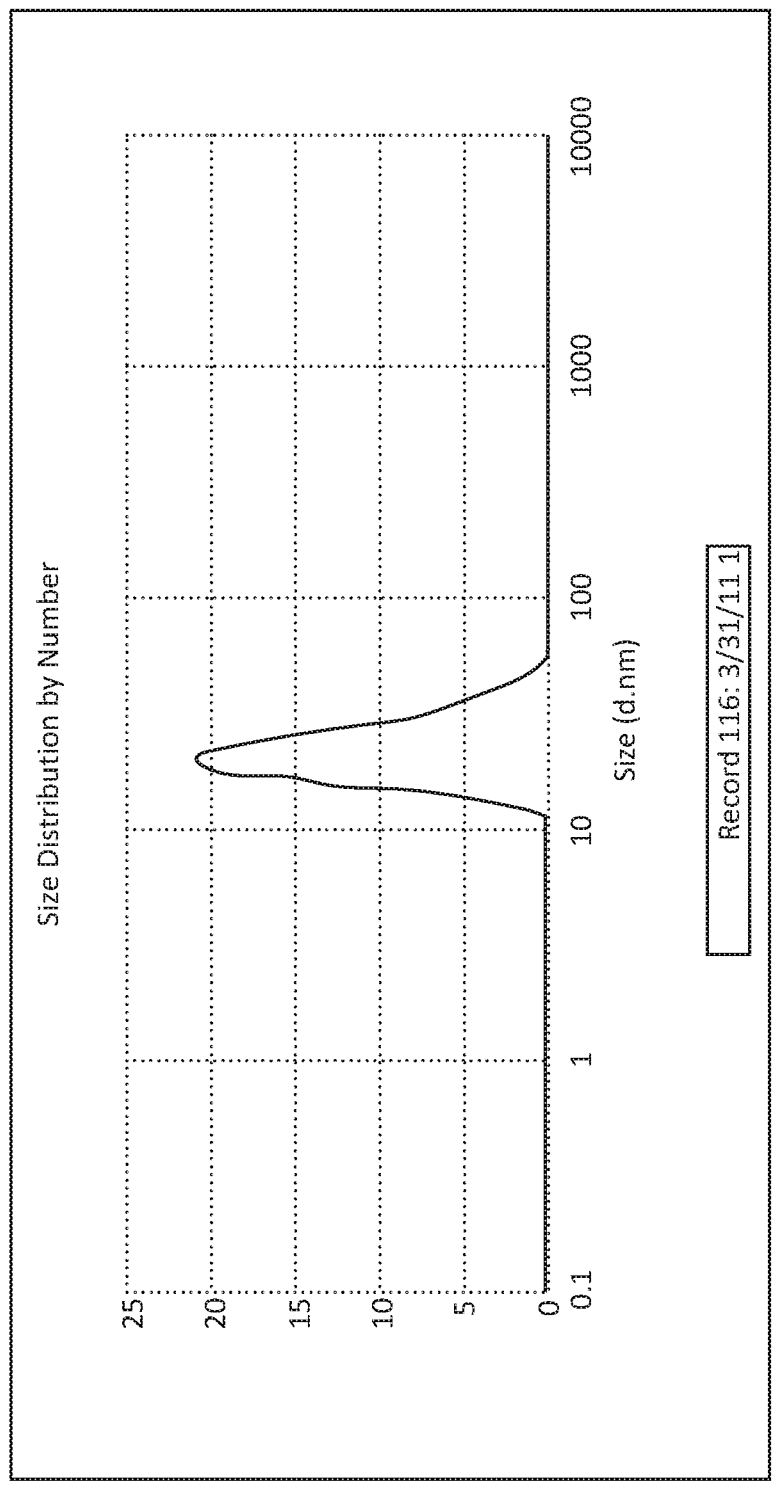
FIG. 3 is a graph showing particle size distribution of 23 nm<±14.2 nm after laser ablation of a Ag target by a laser at 1064 nm wavelength using 3.9 nanosecond pulses to deliver 500 mJ energy per pulse in a double distilled, deionized water system, but without the use of any gradient electromagnetic fields.

FIG. 3 provides the size distribution of particles after laser ablation of a silver (Ag) target by a Nd-YAG laser at 1064 nm wavelength using 3.9 nanosecond pluses to deliver approximately 500 mJ energy per pulse, but without the use of any gradient electromagnetic field(s). The energy content of the laser created an average particle size of 23.15 nm with 99+% of the particles being within <±14.2 nm.

Not only does the particle mixture of FIG. 3 lack uniform size and shape but the zeta-potential (ξ-potential) of these particles is low (<±10 mV). Consequently, the stability of these particles when suspended within any liquid solution is low because of the uneven forces exerted by and on the particles. As a result, even with ions removed, the uneven forces on these particles create instability, which either causes particle disassociation into individual ions or agglomeration of particles together, leading to precipitation out of solution thereby eliminating the nanoparticles from solution.

In order to facilitate uniformity of shape and stability of the particles and impart increased ξ-potential to the particles ablated from the surface of target 24, the system also has an electromagnetic field and sometimes multiple such fields that are substantially parallel to the face of the target 24. In the embodiment shown in FIG. 1, a set of multiple electromagnetic fields comes from a secondary laser 68 that emits a secondary laser beam 70. While the embodiment of FIG. 1 utilizes a laser to create the electromagnetic fields, it is understood that multiple other sources of electromagnetic energy including such electromagnetic energy sources as microwave energy can be used.

While the initial acceleration of particles leaving target 24 can typically reach velocities at or near sonic speed, the particle accelerations can be controlled though the use of pressure within the reaction chamber. This means that in a vacuum the near sonic speed will not be substantially diminished as the nanoparticles move toward and ultimately deposit onto the front end 30 of the chamber 20. However, where either gas or liquid medium is used to manipulate the nanoparticle flow, the pressure within reaction chamber 20 can be modified to have an effect on the rate of accelerations in the ejecta plume, thereby providing the particles with greater or lesser time to be affected by the electromagnetic field(s) created by secondary laser emission 70.

In the embodiment shown in FIGS. 1 and 2, prior to secondary emission 70 passing into reactor chamber, this beam passes through a holographic diffraction grating optic 72 that produces five identifiable and discrete beams of differing spatial orders and different energies 74, 76, 78, 80 and 82 that now can act as discrete electromagnetic fields. While five discrete beams are shown in FIG. 2, the number of such beams may be greater than five or less than five. The holographic diffraction grating optic 72 will preferably allow at least 95% of the energy of the secondary emission 70 to pass through it. Of course, rather than utilize a diffraction grating optic to create multiple discrete laser emissions or fields from a single source laser emission, multiple individual lasers could be utilized to achieve the same effect. The frequency and intensity of these electromagnetic fields can be correlated between the absorption bands of the target material and the plasmon resonance of the ultimately desired sized spherical nanoparticle. Typically, the frequency of secondary laser emission 70 will be in the range of multiples of the frequency of the primary laser emission 12. The frequency is preferably a frequency that is absorbed by the target material, but is absorbed less by the material once it has been ablated and forms the desired particle size and shape, which should be a factor of the plasmon resonance of the ultimately desired sized spherical nanoparticle.

Further, a minimum energy density of the discrete electromagnetic fields 74, 76, 78, 80 and 82 is necessary in order to cause the needed manipulation of the particles caused by the ejecta event, as opposed for example to mere observation of the ejecta event. This manipulation has the effect of imparting sufficient energy to the particles that will cause mis-sized particles, i.e., particles that are either larger or smaller than desired, to either lose mass (in the case of particles that are too large) or gain mass (in the case of particles that are too small) as well as cause the nanoparticles to adopt a uniform shape, typically as spheres. It is believed that this effect occurs because mis-sized particles will more readily absorb the energy of a discrete electromagnetic field of a specific frequency than the desired-sized particles. Because the desired-sized particles absorb little energy from the electromagnetic field, little impetus exists for these particles to change size or shape as they move through the electromagnetic field. Conversely, because mis-sized particles will absorb the energy from the electromagnetic field, the resulting vibrational and/or motion state of these particles creates an impetus for these mis-sized particles to gain or lose material so as to conform to a size and shape that is in harmony with the electromagnetic field.

This determination of the energy density of an electromagnetic field can begin by estimating the mass of all particles within the ejecta event (the mass of a single ejecta event can be determined by weighing the target before and after ablation and calculating the mass loss per ejecta event). Additionally, the mass of the size and shape of the ultimately desired nanoparticles is also known. When utilizing a laser method to create the discrete electromagnetic fields, the energy of photons at the given frequency is known. Therefore, a minimum quantity of photons that are necessary to cause change in a single particle to a desired size and shape can be determined experimentally. The more mass within the ejecta event the higher required energy density of any one of the discrete electromagnetic fields. Further, the maximum energy density of any one of the discrete electromagnetic fields preferably will be less than the ionization energy of the material of the desired sized nanoparticles. Once the energy densities of each of the electromagnetic fields is known, then the total energy density of the secondary beam 70, which is used to create the multiple discrete electromagnetic fields, will likewise be known.

Again, as shown in FIG. 1, after passing through the diffraction grating optic, the now five discrete laser emissions then preferably pass through intensifying optics 84, such as collimating lenses, that insure that the maximum amount of energy is applied to the nanoparticles in the ejecta plume. The five discrete laser emissions then pass through a cylindrical lens 86 which takes the five discrete linear laser emissions and turns them into five discrete planar laser emission that then pass into the chamber 20 through an input optic window 88 and then in front of the target 24 and ultimately out the opposite side of chamber 20 through an output optic window 90. One of skill in the art will understand that the optics require coatings and properties that reduce losses in a specific laser emission frequency and power for maximum efficiency and able to withstand degradation of the optics by the power of the laser emission. Additionally, preferably, the input and output optics 88 and 90 respectively will also each have a piezo-electrically controlled vibrator 32 that can be mounted inside the chamber 30 behind both the optics such that the regular vibration of these optics will preclude buildup of particles, thereby protecting the both the optics from particle buildup and subsequent degradation by the secondary laser emissions.

As can be seen in FIG. 2 these five discrete fields are generally parallel to target 24 and perpendicular to primary laser emission 12 such that if laser emission 12 is designated as an x-axis, then each of the five discrete fields form a y-z plane in front of target 24. Depending on the exact specification of the holographic diffraction grating optic 72, the spatial orders of the discrete laser emissions of the five fields can be ordered. The laser emission fields closest and farthest from target 24, i.e., fields 74 and 82 will have identical energy densities, as will the fields adjacent to the center, i.e., fields 76 and 80. The center field, i.e., field 78 will be of a different energy density from the other two sets of fields. In one example, the outer fields 74 and 82 will have the lowest density, fields 76 and 80 will have higher energy density and center field 78 will have the highest energy density. In another example, the outer fields 74 and 82 will have the highest density, fields 76 and 80 will have relatively lower energy density and center field 78 will have the lowest energy density. Ideally, the first electromagnetic field 74 is at or near the target surface 24 such that the effect of the field on the particles is nearly instantaneous. At a minimum, it is preferred that this first electromagnetic field 74 act on the ejecta plume before the Knudsen boundary layer dissipates.

Figure 4:
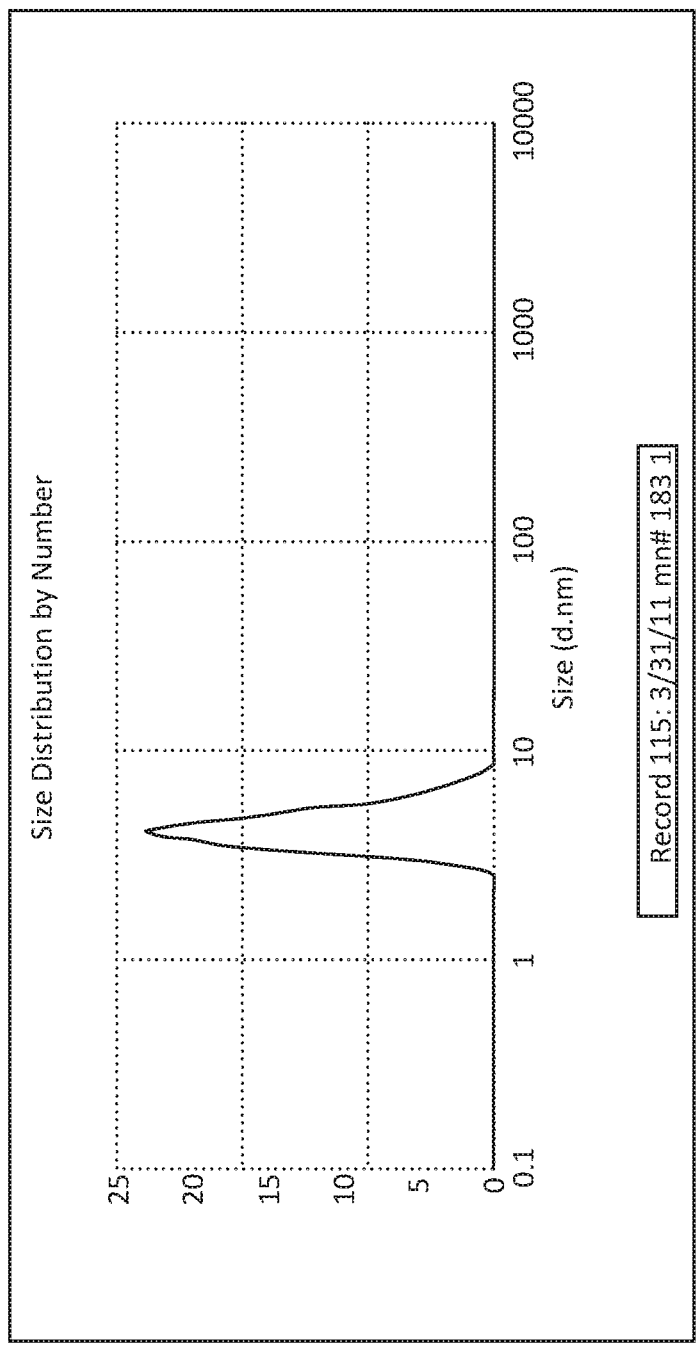
FIG. 4 is a graph showing particle size distribution of 4.6 nm<±1 nm after laser ablation of a Ag target by a laser at 1064 nm wavelength using 3.9 nanosecond pulses to deliver 500 mJ energy per pulse in a double distilled, deionized water system, after the ejecta plume passed through a cross laser at 532 nm which laser had been split by a diffraction optic.
Figure 5:
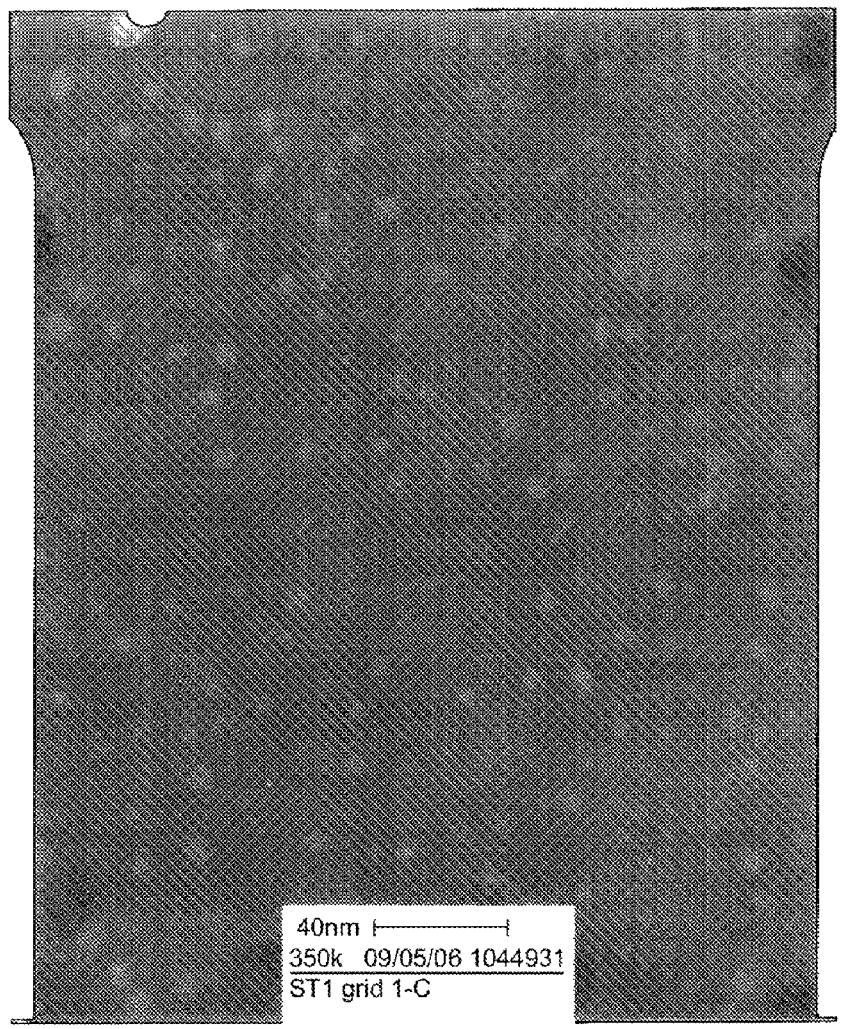
FIG. 5 is a transmission electron microscope image of spherical 10 nm Ag particles suspended within a water solution prepared by the present invention on its surface.

When properly configured, particles within the ejecta plume that have passed through this series of electromagnetic fields are observed to possess uniformity of shape and size, with >99% of the particles being within less than ±1 nm having been achieved as shown in FIG. 4. Furthermore, such a process will also impart ξ-potential to the nanoparticles of at least ±20 mV and preferably of >±30 mV. FIG. 5 provides an electron microscope image of 10 nm silver (Ag) particles prepared by this method (the reason that some of the particles appear smaller than others relates to their position in the background or foreground of the image).

Significantly, the present invention is not limited to the use of five electromagnetic fields created from a holographic diffraction grating optic. For example, where only three electromagnetic fields are utilized in place of the five fields of the above embodiment, one would expect uniformity of size less than the ±1 nm in diameter discussed above as well as lower ξ-potential. Where a single electromagnetic field is used in place of the five fields of the above embodiment, one would expect uniformity of size and shape to be increased over a system without any electromagnetic field, but less than multiple electromagnetic fields.

Figure 6:
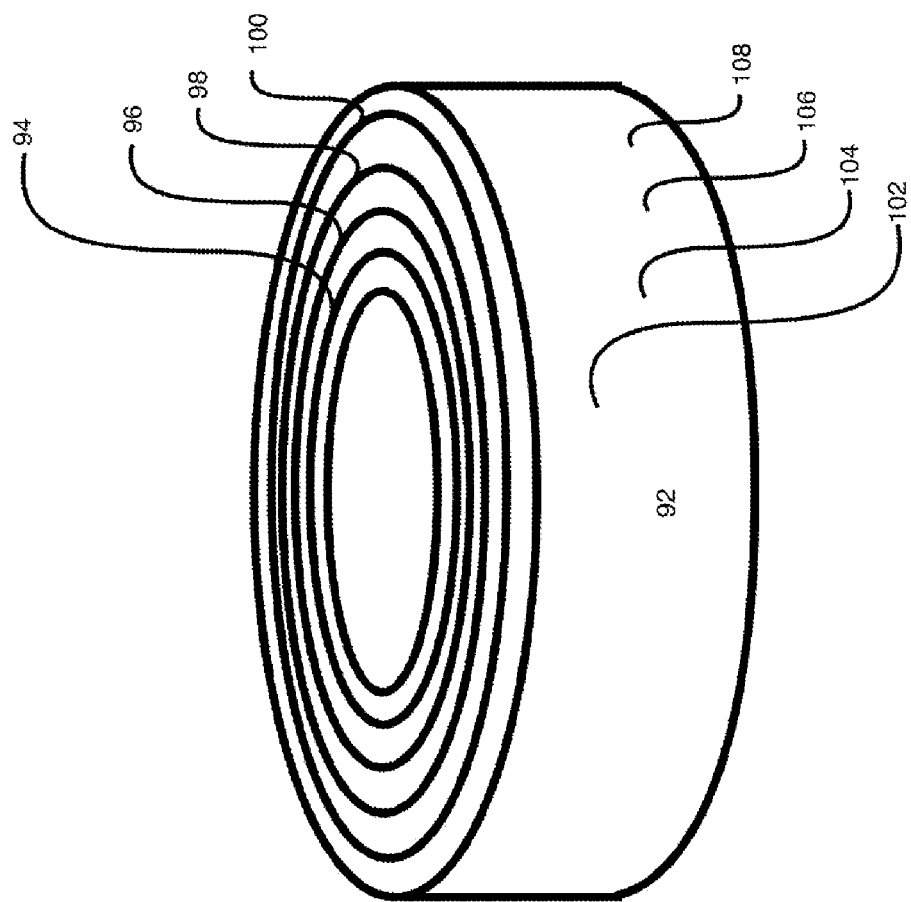
FIG. 6 is a drawing of a toroid that contains multiple metallic concentric bands.

In a further refinement of the invention, a ceramic (or other nonmetallic) toroid 92 can be mounted around target 24. As shown in FIG. 6, the top side of toroid 92 can have multiple metallic concentric bands 94, 96, 98 and 100 on its surface, which concentric bands are each respectively connected to electric leads 102, 104, 106 and 108. Electric leads 102, 104, 106 and 108 are each connected to individual high voltage power suppliers 110, 112, 114 and 116 (shown in FIG. 1), which produce a gradient electric field around and in front of target 24. This gradient electric field is used in addition to, and not in replacement of, the electromagnetic field(s) discussed above. This gradient electric field is used to manipulate the nanoparticles' accelerations and movement within the chamber. This gradient field is controllable by changing voltages on the metallic concentric bands 94, 96, 98 and 100. For example, in a vacuum process, the nanoparticles' movement can be controlled by the gradient electric field.

Because target 24 is depicted in FIG. 1 as having a significant length for this specific embodiment some additional components will ideally be included to maintain the target surface at the desired distance from the primary laser 10 so as both to maintain the focal point for the primary laser emission 12 as well as the spatial relationship of the electromagnetic fields 74, 76, 78, 80 and 82 with the target surface so as to retain consistent effects of these fields on the particles within the ejecta plume. In the embodiment shown in FIG. 1 this is accomplished through a screw mechanism 118, which moves a pinion bar 120 that can move target 24 forward as the target surface is ablated by laser 12, although one of skill in the art will recognize that other mechanisms can be used as well. A detector 122 can be used to monitor the position of the face of target 24 by multiple known methods including by monitoring the first of the electromagnetic fields 74 for a slight interruption by the target face. Conversely, rather than moving target 24 the focal point for laser 12 and the position of the electromagnetic fields 74, 76, 78, 80 and 82 can be changed as the target face moves due to the loss of material from repeated ablations. Similarly, rather than using large targets, small and thin targets can be utilized or the same effect can be achieved if the targets are routinely changed. In yet a further refinement of the invention, multiple targets can be loaded into a target containment vessel 124, which can act in conjunction with the screw mechanism 118 and pinion bar 120 to allow for multiple targets to be ablated without the need to manually insert a new target into the chamber 20.

As the nanoparticles exit the gradient electromagnetic field(s) the process has now produced nanoparticles with high ξ-potential (preferably >±30 mV). This means that these nanoparticles, when suspended within any liquid, including any polar liquid such as water, exert uniform forces on each other and thereby remain suspended in solution without the need for any added surfactants. The lack of surfactants now allows introduction of these nanoparticles into applications where the presence of the surfactants would otherwise prove problematic, such as biological systems.

When utilizing a liquid as the carrier for the nanoparticles, any organic, non-polar compound can be used as well as polar solutions including alcohols and water. Preferably the chosen liquid will be free from ions and particulate matter to prevent unwanted agglomeration of the particles to impurities within the liquid. When using water, multiple methods exist to remove ionic and particulate matter including distillation and even multiple distillations, reverse osmosis, deionization techniques and ultrafiltration.

FIG. 7 provides an example of another embodiment of the present invention wherein the ejecta plume is created by an electric discharge process instead of by laser ablation. Since the electric discharge will produce ablation in a vacuum system, only an ejecta plume is created in such a system. As will be readily understood by one skilled in the art, many of the same principles that apply to the laser ablation process will apply to the process to ablate material using an electric discharge method. For example, rather than a primary laser beam impacting a target, the electric discharge process utilizes a target anode 126 to create the ejecta plume near the surface 128 of a cathode material 130. In the embodiment shown in FIG. 7, this is accomplished by placing the cathode material 130 inside a holder 134, which contains a permanent magnet 132. The holder 134 is held within a tube 136 that is part of a chamber 140.

An electromagnet 141 extends around the tube 136 and when energized creates a magnetic field that drives the holder 134 upwards toward the tip 138 of the target anode wire 126. The electric potential difference between the anode wire 126 and the cathode material 130 is sufficient to break down the resistance of the heavy atmosphere between the surface 128 of the cathode material and the tip 138 of the anode wire which discharge creates an ejecta plume of material from the anode that moves toward the surface of the cathode material and which then effectively bounces off of the curved cathode surface 128 and then moves through the electromagnetic field(s) 153. The upward movement of the holder 134 can be limited either by a piston-type control from the bottom of the holder or even by the physical interaction of the cathode surface 128 with the tip 138 of the anode wire 126. As the anode wire loses mass through the ablation of its tip, its length can be maintained with a wire feeding mechanism 142.

With the ejecta plume formed in the same location on each upward pulse of the cathode material 130 and moving within the main cavity of chamber 140, an electromagnetic field, or sometimes gradient electromagnetic fields, can then be introduced into the main cavity of chamber 140 through an optic window 144 at one end of chamber 140 while exiting through a second option window 148 at the other end. As with the optics shown in FIG. 1, the input and output optics 144 and 148 can also include piezo-electrically controlled vibrators 150 to help prevent particle buildup on the optics. The frequency and strength of the electromagnetic field or fields 153, whether created from a secondary laser 152 (or set of lasers) or other sources, will be determined by the same parameters as those described above for the gradient electromagnetic fields in FIGS. 1 and 2.

Fluid flow can be introduced into the chamber 140 through an input port 146 and exit through an output port 154 which fluid can be used to collect the nanoparticles after they have passed through the electromagnetic field(s). Additionally, one of skill in the art can readily understand how this single arrangement of an anode wire and cathode material can be replicated, preferably in a linear manner, to utilize the same electromagnetic field or multiple gradient electromagnetic fields for multiple anode-cathode units in order to increase production of nanoparticles.

Consistent with the creation of an ejecta plume using laser ablation, the strength and duration of the electrical pulse from the tip 138 of the anode wire 126 will determine the total energy delivered ($E_T$) per pulse and will be a function of both of the target material's bonding energy ($E_B$), the ionization energy ($E_I$) as well as the number of total atoms/molecules to be contained within the desired final spherical nanoparticle.

Even with the attempt to control particle size through precise energy delivery to the target surface, as with the ejecta plume created by laser ablation, the plume will contain a distribution of uncharged, nonionic particles ranging in size from small clusters of single digit atoms/molecules to particles of the generally desired size as well as many even larger particles. Further, because the electrical discharge method will almost always utilize metallic targets (because they act as the anode of the electric circuit), even though the energy delivered to the target will be less than the target's ionization energy, the initial ejecta plume will likely also contain some ionized, individual atoms. However, because the target wire itself is already an anode, the ionized atoms will readily be pulled back to the anode target and reabsorbed into the crystalline matrix of the material.

Similarly, control of the velocity of the ejecta plume can also be accomplished through use of the fluid pressure within the reaction chamber in the same manner as discussed above with the laser ablation method. The following examples are given to illustrate various embodiments within, and aspects of, the scope of the present invention. These are given by way of example only, and it is understood that the following examples are not comprehensive or exhaustive of the many types of embodiments of the present invention that can be prepared in accordance with the present invention.

Example 1

A silver (Ag) target was held within a chamber through which flowed triple distilled deionized water. The Ag target was ablated using a primary laser with a 1064 nm wavelength at 80 mJ with a 1 mm focal spot size and with 9 nanosecond (ns) pulse lengths. The secondary laser was a continuous 532 nm laser with 0.5 W power going into the diffraction grating which created three distinct electromagnetic fields in front of the Ag target. The process created 10 nm diameter Ag spheres with 99+% of those spheres within ±1 nm diameter.

Example 2

A silver (Ag) target was held within a chamber through which flowed triple distilled deionized water. The Ag target was ablated using a primary laser with a 1064 nm wavelength at 620 mJ with a 6 mm focal spot size and with 3.7 nanosecond pulse lengths. The secondary laser was a continuous 532 nm laser with 0.5 W power going into the diffraction grating which created five distinct electromagnetic fields in front of the Ag target. The process created 14 nm diameter Ag spheres with 99+% of those spheres within ±1 nm diameter.

Example 3

A silver (Ag) anode wire target was ablated through a high voltage (800 V) between the target anode and a grounded Ag cathode both were submerged into a chamber through which flowed triple distilled deionized water. The secondary laser was a continuous 1064 nm laser with 5 W power that was not divided with any diffraction grating optics. The process created 10 nm diameter Ag spheres with 99+% of those spheres within ±1 nm diameter.

Example 4

A copper (Cu) target was held within a chamber through which flowed triple distilled deionized water. The Cu target was ablated using a primary laser with a 1064 nm wavelength at 80 mJ with a 1 mm focal spot size and with 9 nanosecond pulse lengths. The secondary laser was a continuous 264 nm laser with 0.25 W power going into the diffraction grating, which created three distinct electromagnetic fields in front of the Cu target. The process created 8 nm diameter Cu spheres with 99+% of those spheres within ±1 nm diameter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for manufacturing generally spherical metal nanoparticles of high size uniformity, comprising:
   providing a metal target within a chamber containing a fluid;
   ablating a surface of the metal target using pulsed energy from a first energy source selected from a laser or electric discharge to create an ejecta plume of initial metal nanoparticles moving away from the metal target;
   charging the metal target in order to draw ionized atoms and particles in the ejecta plume back to the metal target;
   placing a continuous planar electromagnetic energy field generated by a second energy source selected from a laser or a microwave source in front of the metal target;
   the continuous planar electromagnetic energy field manipulating the initial metal nanoparticles as they move away from the metal target and pass through the continuous planar electromagnetic energy field to create manipulated metal nanoparticles that have increased size uniformity compared to the initial metal nanoparticles, are generally spherical, are ionically stable, are suspended in the fluid, and have diameters less than 35 nm; and
   collecting the manipulated metal nanoparticles as a stable suspension in a liquid.

2. The method of claim 1, wherein the pulsed energy from the first energy source is less than the ionization energy of the metal.

3. The method of claim 1, wherein the pulsed energy from the first energy source breaks intranuclear bonds without creating heat sufficient to result in significant ion formation.

4. The method of claim 1, wherein the pulsed energy comprises pulses of laser energy of less than 10 nanoseconds.

5. The method of claim 1, wherein the continuous planar electromagnetic energy field has an energy density less than the ionization energy of the metal.

6. The method of claim 1, wherein the continuous and planar electromagnetic energy field causes some of the initial metal nanoparticles to split and small clusters of atoms to agglomerate with other particles, thereby increasing size uniformity.

7. The method of claim 1, wherein the continuous planar electromagnetic energy field has an energy density so that at least 99% of the manipulated metal nanoparticles have a diameter within ±3 nm of an average diameter.

8. The method of claim 7, wherein at least 99% of the manipulated metal nanoparticles have a diameter within ±1 nm of an average diameter.

9. The method of claim 1, wherein the manipulated metal nanoparticles have diameters of 14 nm or less.

10. The method of claim 1, wherein the manipulated metal nanoparticles have diameters of 10 nm or less.

11. The method of claim 1, wherein the manipulated metal nanoparticles have diameters between 2.5 nm and 5 nm.

12. The method of claim 1, wherein the manipulated metal nanoparticles comprise at least one of silver, gold, copper or platinum.

13. A method for manufacturing generally spherical metal nanoparticles of high size uniformity, comprising:
    providing a metal target comprising at least one of silver, gold, copper or platinum within a chamber containing a fluid;
    ablating a surface of the metal target using pulsed energy from a first laser to create an ejecta plume of initial metal nanoparticles moving away from the metal target;
    charging the metal target in order to draw ionized atoms and particles in the ejecta plume back to the metal target;
    placing at least one continuous planar electromagnetic energy field generated by at least one additional laser in front of the metal target;
    the at least one continuous planar electromagnetic energy field manipulating the initial metal nanoparticles as they move away from the metal target and pass through the at least one continuous planar electromagnetic energy field to create manipulated metal nanoparticles that have increased size uniformity compared to the initial metal nanoparticles, are substantially spherical, are ionically stable, are suspended in the fluid, and have an average diameter less than 35 nm; and
    collecting the manipulated metal nanoparticles as a stable suspension.

14. The method of claim 13, wherein the pulsed energy from the first energy source is less than the ionization energy of silver, gold, copper or platinum.

15. The method of claim 13, wherein the continuous planar electromagnetic energy field has an energy density less than the ionization energy of silver, gold, copper or platinum.

16. The method of claim 13, the at least one continuous planar electromagnetic energy field having an energy density so that at least 99% of the manipulated metal nanoparticles have a diameter within ±3 nm of the average diameter.

17. The method of claim 16, wherein at least 99% of the manipulated metal nanoparticles have a diameter within ±1 nm of the average diameter.

18. The method of claim 13, wherein the manipulated metal nanoparticles have diameters of 14 nm or less.

19. A method for manufacturing generally spherical metal nanoparticles of high size uniformity, comprising:
    providing a metal target comprising silver, gold, silver alloy or gold alloy within a chamber containing a fluid;
    ablating a surface of the metal target using pulsed energy from a first laser to create an ejecta plume of initial metal nanoparticles moving away from the metal target;

charging the metal target in order to draw ionized atoms and particles in the ejecta plume back to the metal target;

placing at least one continuous planar electromagnetic energy field generated by at least one additional laser in front of the metal target;

the at least one continuous planar electromagnetic energy field manipulating the initial metal nanoparticles as they move away from the metal target and pass through the at least one continuous electromagnetic energy field to create manipulated metal nanoparticles that have increased size uniformity compared to the initial metal nanoparticles, are substantially spherical, are ionically stable, and are suspended in the fluid, and that have an average diameter less than 35 nm; and collecting the manipulated metal nanoparticles as a stable suspension.

* * * * *

UNITED STATES PATENT AND TRADEMARK OFFICE
CERTIFICATE OF CORRECTION

PATENT NO. : 10,610,934 B2
APPLICATION NO. : 15/808088
DATED : April 7, 2020
INVENTOR(S) : William A. Niedermeyer It is certified that error appears in the above-identified patent and that said Letters Patent is hereby corrected as shown below:

Page 3
Item (56), References Cited, change "U.S. Appl. No. 16/012,508, filed Niedermeyer" to –U.S. Appl. No. 16/012,508, filed June 19, 2018, Niedermeyer–

Page 4
Item (56), References Cited, change "Santos et al, "Enhancemetn of antibiotic effect via gold:silver-alloy nanoparticles", J. Nanopart Res (2012) 14:859, pp. 1-8." to –Santos et al, "Enhancement of antibiotic effect via gold:silver-alloy nanoparticles", J. Nanopart Res (2012) 14:859, pp. 1-8."–

Item (56), References Cited, add –U.S. Appl. No. 14/861,375, filed Sept. 22, 2015, Office Action dated Apr. 3, 2018.–

Column 1
Line 8, after "This Application" insert --is a continuation of U.S. patent application Ser. No. 14/298,594, filed June 6, 2014, now Pat. No. 10,137,503, which--

Column 4
Line 38, change "relative" to –relatively–

Column 7
Line 9, change "exists" to –exist–

Column 9
Line 18, remove [a]

Column 11
Line 18, change "able" to –ability–

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*